Patented Nov. 13, 1928.

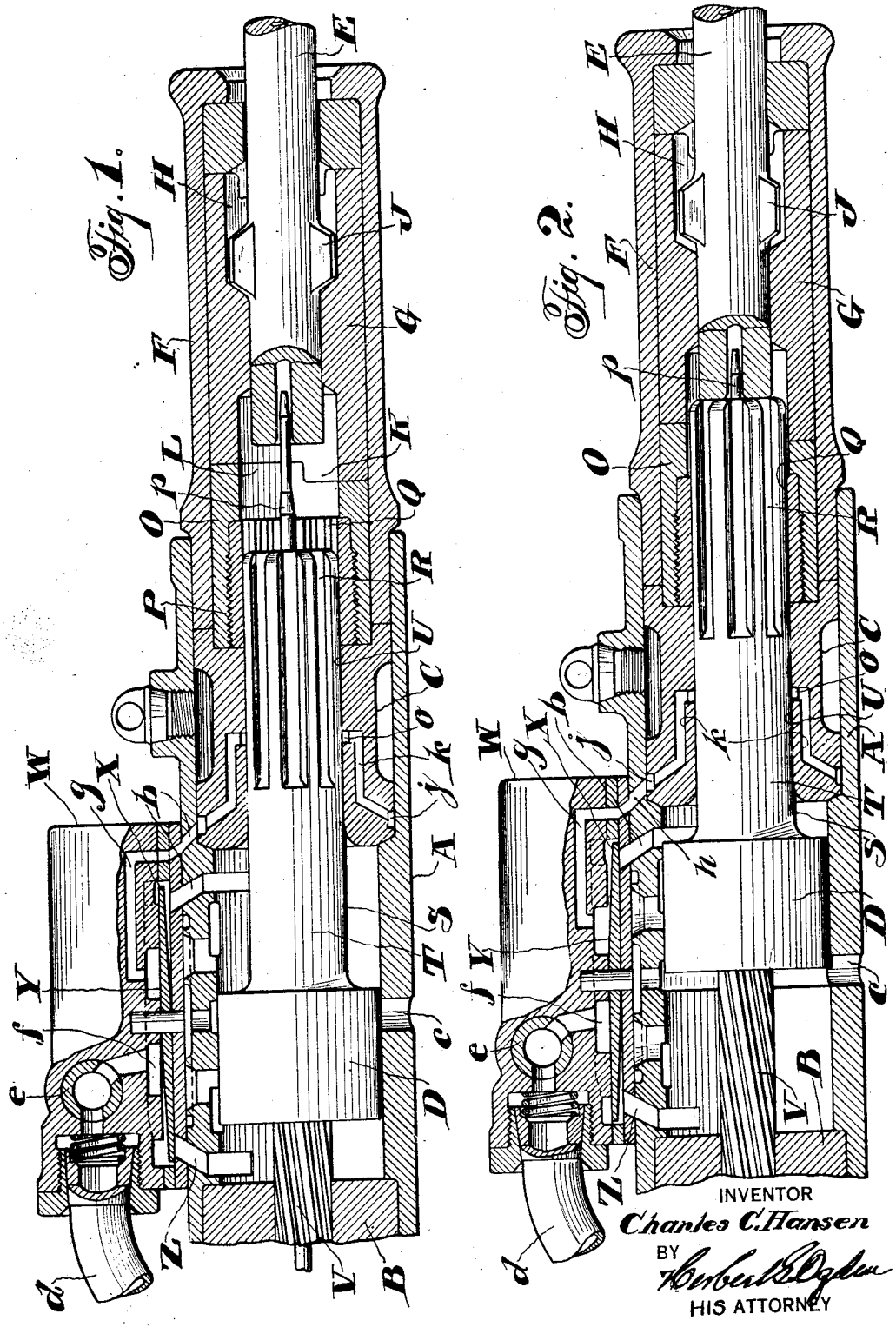

1,691,570

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

ROCK DRILL.

Application filed June 7, 1926. Serial No. 114,232.

This invention relates to rock drills, but more particularly to a blowing device for fluid actuated rock drills of the hammer type.

The objects of the invention are to admit an intermittent supply of pressure fluid under full line pressure to the drill steel for cleansing the drill hole and to permit such admission of pressure fluid to the drill hole at the most advantageous period in the cycle of operations of the drill.

Other objects will appear hereinafter.

The invention consists of the combination of elements and features of construction substantially as hereinafter described and more particularly pointed out in the appended claim and illustrated in the accompanying drawings, in which Figure 1 is a longitudinal view in section showing the piston in position for admitting pressure fluid to the drill steel, and Figure 2 is a view similar to Figure 1 illustrating the manner in which the supply of pressure fluid to the drill steel is cut off by the piston extension.

Referring to the drawings, the invention is shown embodied in a rock drill having a cylinder A closed at its rearward end by a back cylinder washer B and at its forward end by a bushing C. Disposed within the cylinder A is a reciprocatory piston D adapted to deliver blows on a hollow drill steel E supported by a front head F which, in the present instance, extends with its rearward end into the front end of the cylinder A. The front head may be held in assembled position with respect to the cylinder by means of the usual side bolts (not shown).

Disposed within the front end of the front head F is a chuck jaw G having the usual flats H to engage wings J of the drill steel E for preventing relative rotation between the drill steel and the chuck jaw. At the rearward end of the chuck jaw G are formed clutch teeth K to interlock with similar clutch teeth L of a chuck O. A chuck nut P is screwed into the rearward end of the chuck O and is provided with suitable ribs Q which engage slidably flutes R formed in the front end of an extension S of the piston D. The flutes R preferably extend only along the forward end of the extension S and are of such length with respect to the total length of the extension S that the rearward end of said flutes will not be drawn into communication with the front end of the cylinder when the piston D reaches its rearward limiting position during the normal operation of the drill. By thus forming the flutes R only on the front end of the extension S, the rearward portion T of the extension will be of smooth and cylindrical form to cooperate slidably with a bore U of the bushing C.

As will be noted from the foregoing description, the piston D, the chuck parts in the front head F, and the drill steel E are interlocked against relative rotation so that on the rearward stroke of the piston D, during which stroke the piston is adapted to rotate on the rifle bar V in a well understood manner, the position of the drill steel E will be changed in the drill hole for the succeeding blow of the piston.

Secured to the cylinder A is a valve chest W having a valve chamber X wherein is arranged an oscillatory plate valve Y. The valve Y and the valve chest W are merely shown for illustrative purposes and it is to be understood that the invention is applicable to other types of drills in which other types of distributing valves may be employed for distributing the pressure fluid or, to the type of drills in which the piston acts as a means for distributing the pressure fluid. Passages Z and $b$ lead from the chamber X to the rearward and front ends of the cylinder and are controlled by the ends of the valve Y to admit pressure fluid to the cylinder for reciprocating the piston. A port $c$ formed in the wall of the cylinder A serves as a free exhaust port for the cylinder and is controlled only by the piston D.

Pressure fluid for actuating the drill is conveyed from a source of supply by a connection $d$, in this instance secured to the rearward end of the valve chest W. The admission of pressure fluid to the drill is controlled by a suitable throttle valve $e$ interposed between the connection $d$ and an annular chamber $f$ adjacent to and forming a part of the valve chamber X.

Usually in drills of this type, means are provided for conveying cleansing fluid to the drill hole for removing the cuttings therefrom. Such means may consist of a tube or tubes extending through the rifle bar and the piston to deliver the cleansing fluid to the hollow drill steel E. These tubes are usually connected to a source of supply so that a constant flow of either pressure fluid or water, or both water and pressure fluid, are constantly flowing into the drill hole. In this way the fluids are caused to intermingle and the pressure of the water which is usually of lower value than that of the pressure fluid will be augmented by the pressure fluid to raise the cuttings from the drill hole. In order to accomplish this result in the present instance a passage $g$ in constant communication with the chamber $f$ is formed through the valve chest W to communicate at its forward end with a passage $h$ formed through the wall of the cylinder A adjacent the rearward end of the bushing C. In the rearward end of the bushing C is formed an external annular groove $j$ to register with the passage $h$, and passages $k$, are formed in the bushing C to convey pressure fluid from the groove $j$ to an internal annular groove $o$ formed in the bore U of the bushing C. The annular groove $o$ is preferably so positioned in the bushing C that during a portion of the stroke of the piston D, said groove will be covered by the cylindrical portion T of the piston extension S.

In the present instance a water tube $p$ is arranged coaxially through the drill to extend at its front end into the drill steel E. The water tube $p$ may be connected to a source of supply in a well known manner to deliver a constant stream of water to the drill hole.

The operation of the device is as follows: When the throttle valve $e$ is rotated to the position shown in the drawings, pressure fluid will be admitted to the chamber $f$ to actuate the valve and the piston. Upon the admission of pressure fluid to the chamber $f$, a constant supply of pressure fluid will be maintained in the passages leading from the annular chamber $f$ to the groove $o$ in the bushing C. As the piston moves rearwardly from the position illustrated in Figure 2, the groove $o$ will be uncovered by the cylindrical portion T of the extension S and pressure fluid will then pass directly from the chamber $f$ through the flutes R of the extension S into the drill steel E and will continue to flow into the drill hole until the piston D is reversed and again approaches the front end of the cylinder when the cylindrical portion T will cover the groove $o$ and thus cut off the admission of pressure fluid to the drill steel. In this way an intermittent supply of pressure fluid will be admitted to the drill steel at that period of the cycle of operations of the drill when the piston D is removed from the drill steel and when the minimum pressure is exerted on the drill steel, thus providing a free path for the cleansing fluid through the drill into the drill hole.

The above described invention has been found to be unusually efficient in operation and assures a uniform intermingling of the cleansing fluids. Another desirable advantage of the present invention is that by directing the pressure fluid through the flutes of the extension, any dust or foreign matter which may be drawn through the chuck parts into the interior of the drill and which may collect on the forward end of the flutes, will be blown therefrom. In this way the cooperating surfaces of the flutes and the ribs of the chuck nut P will be protected against the abrading action of such dust and, in consequence, the parts will render service for a considerably longer period of time than will similar parts unprovided with this novel feature.

I claim:

In a rock drill, the combination of a cylinder, a bushing in the front end of the cylinder, said bushing having a bore, a reciprocatory hammer piston in the cylinder, an extension on the piston slidable in the bore, said extension having flutes in its front end and a smooth cylindrical rearward portion, a valve chest on the cylinder having a valve chamber, a passage in the valve chest leading from a source of supply to the valve chamber, a throttle valve controlling the passage, and a passage leading from the valve chamber to the bore constantly exposed to pressure fluid from the valve chamber during the operation of the drill, said passage being controlled by the cylindrical portion of the extension for obtaining an uninterrupted flow of pressure fluid through the flutes during a portion of both the forward and rearward strokes of the piston.

In testimony whereof I have signed this specification.

CHARLES C. HANSEN.